United States Patent [19]

Johnson

[11] 4,025,559
[45] May 24, 1977

[54] METHOD FOR CONTINUOUS HYDROLYSIS OF POLYURETHANE FOAM IN RESTRICTED TUBULAR REACTION ZONE AND RECOVERY

[75] Inventor: Olin B. Johnson, Bloomfield Hills, Mich.

[73] Assignee: Ford Motor Company, Dearborn, Mich.

[22] Filed: Dec. 18, 1972

[21] Appl. No.: 315,976

[52] U.S. Cl. .............................. 260/578; 260/582
[51] Int. Cl.² ......................................... C07C 87/28
[58] Field of Search ........................... 260/578, 582

[56] References Cited

UNITED STATES PATENTS 3,225,094  12/1965  Wolf ................................... 260/578
3,499,035  3/1970  Kober et al. ........................ 260/578

Primary Examiner—Elbert L. Roberts
Attorney, Agent, or Firm—Olin B. Johnson; Keith L. Zerschling

[57] ABSTRACT

A continuous method for converting particulate polyurethane foam to diamines and liquid polymeric hydrolysis product of the polyurethane (polyethers or polyesters) and simultaneously separating diamines from the liquid polymeric product comprises propelling a stream of particulate polyurethane foam into a first end of an enclosed tubular reaction zone, introducing steam into said first end of said tubular reaction zone under sufficient pressure to pass through said tubular reaction zone and exit from the opposite end thereof into an enclosed separation zone of greater cross sectional area than said tubular reaction zone while carrying with it the liquid and gaseous hydrolysis products of the particulate polyurethane, recovering liquid hydrolysate from the lower half of the enclosed separation zone, and recovering gaseous effluent from the upper half of the enclosed separation zone, said particulate polyurethane in passing from the first end of said tubular reaction zone toward the opposite end thereof being obstructed by two or more grids with apertures of cross sectional area which vary inversely with their distance from said first end of said tubular reaction zone.

2 Claims, 1 Drawing Figure

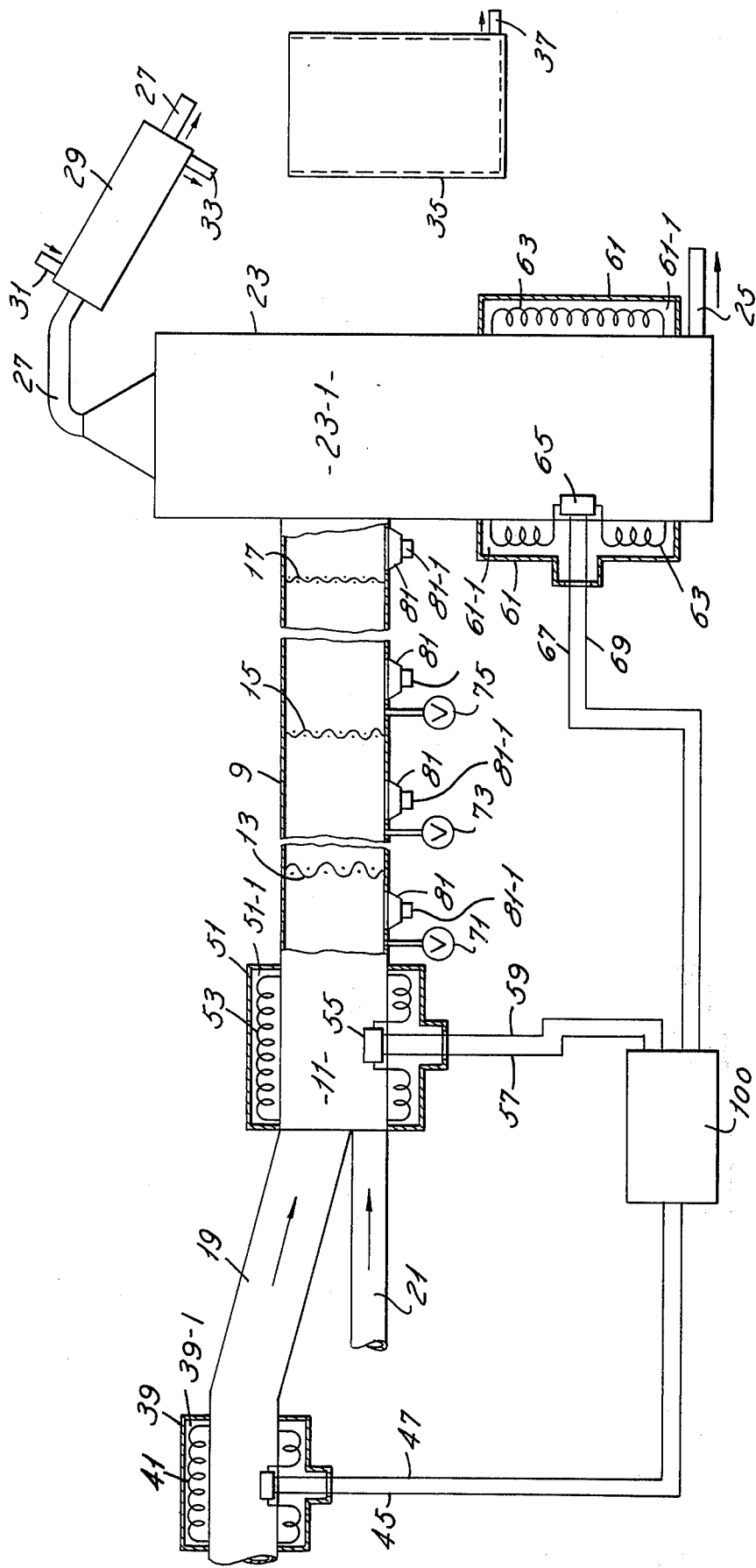

METHOD FOR CONTINUOUS HYDROLYSIS OF POLYURETHANE FOAM IN RESTRICTED TUBULAR REACTION ZONE AND RECOVERY

BACKGROUND OF THE INVENTION

Increased industrial use of polyurethane foam is creating a growing disposal problem.

A very large quantity of "new" polyurethane foam scrap is generated by industrial plants engaged in the manufacture of articles, e.g., seating, which employ foam as a cushioning element. In such operations, up to about 30 percent of the starting material may end up as scrap. A limited market exists for a portion of this new scrap.

A very large and increasing quantity of "used" polyurethane foam scrap is a product of automobile shredders which have as their primary function the recovery of metal from junked automobiles for recycling. The present method of disposal of non-metallic reject from such shredders is by sanitary land fill. Aside from the complete loss of the value of such foam in this method of disposal, the increasing volume of such scrap and the increasing cost and availability of land fill sites will soon create a major disposal problem.

The hydrolysis of polyurethane foam at temperatures in the range of about 425° to about 750° F. at pressures of about 0.5 to about 1.5 atmospheres has been disclosed by Jacob Braslaw and Lee R. Mahoney in their U.S. patent application Ser. No. 315,978 filed of even date. The hydrolysis of polyurethane foam at elevated temperatures and pressures has been disclosed by Lee. R. Mahoney in his U. S. patent application Ser. No. 283,884 filed Aug. 25, 1972. The disclosures of these applications are herewith incorporated herein by reference. About 1 part by weight of water per 100 parts by weight of foam is necessary for complete hydrolysis.

THE INVENTION

This invention is concerned with providing a continuous process for hydrolysis of polyurethane foam while minimizing the residence time of the foam in the hydrolysis zone.

Large scale hydrolysis of polyurethane foam dictates the use of a continuous process. Solid material is best handled in a continuous process when such material is in particulate form. Particulate form also provides the maximum exposed surface area to the hydrolyzing medium.

In the process of this invention, separate streams of stream and particulate polyurethane foam are fed into a first end of the tubular reactor. The polyurethane stream may also contain steam or another gas. The water vapor — comprising hydrolysis gas is introduced under sufficient pressure to cause it to pass through the tubular reaction zone and to carry the gaseous and liquid products of foam hydrolysis with it into a gas-liquid separation zone communicating with the tubular reaction zone at the end of such zone opposite said first end.

The reaction zone length, temperature and impediments to the movement of solids can be controlled so as to effect complete or essentially complete conversion of the foam into gaseous and liquid hydrolysates before the solid foam reaches the gas - liquid separation zone. In order to accomplish this without unduly extending the length of the reaction zone, the movement of foam particles through the tubular reaction zone is impeded by two or more obstructing grids with apertures of cross sectional area which vary inversely with their distance from said first end.

The polyurethane foam is prepared for this process by grinding or other suitable means. The particles are advantageously of substantially uniform size with their average diameters being below about 1 inch, preferably below 0.5 inch.

Polyurethane foams are typically prepared by reacting a polyether, e.g., polypropylene oxide with ethylene cap, with a diisocyanate, e.g., toluene diisocyanate, in the presence of an amine catalyst, e.g., methyl morpholine or N, N - diethyl ethanolamine, and a small amount of water. This reaction mixture will commonly include, in minor amounts, a chlorinated aromatic amine, e.g., 4, 4' - diamino, 3,5,3',5' - tetrachloro diphenyl sulfonate - triethylene salt.

Other polyurethane foams are prepared from diisocyanates and polyesters, e.g., esters of polyhydric alcohols, e.g., 1,4 - butane diol, with polycarboxylic acids, e.g., adipic acid.

If the reaction is carried out in the presence of an activating mixture, which includes water or an equivalent agent for hydrolyzing the diisocyanate, the accompanying evolution of carbon dioxide makes the mixture self-forming so that the resulting resin block has a foam-like or cellular structure. In addition to water, such activating mixture includes generally an accelerator such as an amine, an emulsifying agent such as a sulfonated oil and an agent such as a paraffin oil for regulating the pore size in the resin foam.

Polyurethane foam production is described, for instance, in Polyurethanes, Chemistry and Technology by J. H. Saunders and K. C. Frisch, Part II Technology, Interscience Publishers, New York, New York (1967).

In this process, a gaseous effluent including the steam used for hydrolysis and a liquid hydrolysate are carried by the steam from the tubular reaction zone, hydrolysis zone, into an enclosed gas - liquid separation zone having greater cross sectional area than the reaction zone. Liquid hydrolysate is recovered from the lower half of the enclosed separation zone. Gaseous effluent is recovered from the upper half of the enclosed separation zone.

The gaseous effluent is removed from the gas - liquid separation zone as a side stream, preferably overhead, cooled and recovered as a solution of diamines in water. The diamines may then be recovered from the water by distillation. Diamines can be converted to diisocyanates by reaction with phosgene. The diisocyanates thus produced can be used as a reactant in the preparation of polyurethane foam or other useful products. A liquid product of the hydrolysis of polyurethane is recovered as bottoms from the gas - liquid separation zone. When the polyurethane undergoing hydrolysis is one prepared from diisocyanates and polyethers, this bottoms product comprises polyethers with pendant reactive groups, e.g., polypropylene oxide with free amino, urethane and hydroxyl groups.

DETAILED DESCRIPTION OF DRAWING AND PREFERRED EMBODIMENT

The drawing is a schematic view showing one arrangement of apparatus suitable for carrying out the method of this invention.

In the drawing, reactor 9 encloses a tubular hydrolysis zone 11. Positioned within tubular hydrolysis zone 11 are a plurality of grids, here illustrated by grids, 13, 15 and 17. Particulate polyurethane foam is fed into tubular reaction zone 11 at a first end through tubular conduit 19. The foam may be augured into tubular hydrolysis zone 11 from conduit 19 or carried in by a suitably pressurized gaseous medium, e.g., nitrogen, steam, etc. Superheated steam is released into tubular reaction zone 11 through tubular conduit 21. The combined pressure of this steam and accompanying diluent gases, if any, is sufficient to sweep through tubular hydrolysis zone 11 into gas - liquid separation zone 23-1 of gas - liquid separation tank 23 carrying with it the gaseous and liquid hydrolysate of the polyurethane foam. Other gases, e.g., nitrogen may enter hydrolysis zone 11 with the foam via conduit 19 or with the steam via conduit 21. The grids 13, 15, and 17 have apertures which vary inversely in cross-sectional area with their distance from conduit 19 and the first end of tubular hydrolysis zone 11 and directly with their distance from gas - liquid separation zone 23-1. Grids 13, 15 and 17 impede the progress of successively smaller particles of polyurethane foam moving along tubular reaction zone 11 toward gas - liquid separation zone 23-1 allowing time for complete or essentially complete conversion of the foam to liquid and gaseous products within tubular hydrolysis zone 11. Near its bottom, gas - liquid separation tank 23 is provided with an outlet conduit 25 for recovering liquid hydrolysate from gas - liquid separation zone 23-1. Water vapor and gaseous hydrolysis products exit from gas - liquid separation zone 23-1 near its top through outlet conduit 27 and pass through a condenser 29 wherein the gaseous effluent is cooled and condensed to a liquid by a flow of water which is continuously introduced into condenser 29 via water inlet conduit 31 and continuously removed via water outlet conduit 33. The now liquified effluent from hydrolysis zone 11 comprises diamines and water which empty by gravity flow from conduit 27 into collecting tank 35. The liquid in collecting tank 35 is removed therefrom via outlet conduit 37 for separation and recovery of diamines.

The particulate polyurethane foam introduced into tubular hydrolysis zone 11 via conduit 19 is advantageously preheated to a temperature in the range of about 400° F to about 650° F. by any suitable means. Means for this is illustrated here by housing 39 which contains heating element 41. Heating element 41 is operatively connected with a temperature sensing and temperature control unit 43, e.g., a thermostat. Unit 43 is operatively connected via conductors 45 and 47 to an alternating current, electrical power source 100.

The tubular hydrolysis zone 11 is maintained at a temperature between about 425° and 750° F., preferably between about 490° and 650° F. The temperature of the hydrolysis zone 11 is maintained by suitable heating means. Such heating means is here illustrated by housing 51, heating element 53, temperature sensing and temperature control unit 55, conductors 57 and 59 and alternating current power source 100. It is, of course, to be understood that heat will be introduced into hydrolysis zone 11 with steam via conduit 21 and preheated foam via conduit 19. It will be understood by those skilled in the art that invention here does not lie in the use of this or any other particular heat and heat control means but that any suitable means for maintaining the temperature of hydrolysis zone 11 within the prescribed range can be used. The same is true for all other heating means illustrated in the drawing.

Likewise, it may be necessary or desirable to provide heating means associated with gas - liquid separation tank 23. This will depend on the size of reactor 9, the size of gas - liquid separation tank 23, the temperature of tubular hydrolysis zone 11 and the temperature of the steam entering via conduit 21. Such heating means is here illustrated by housing 61, heating element 63, temperature sensing and temperature control means 65, conductors 67 and 69 and alternating current, electrical power source 100. The obstructions to passage of particulate foam through hydrolysis zone 11 represented by grids 13, 15 and 17 creates a potential problem of temporary clogging if feed control is imperfect. For this reason tubular hydrolysis zone 11 is provided with pressure release valves 71, 73 and 75 positioned on the up-stream side of grids 13, 15 and 17, respectively. Particularly, in the hydrolysis of particulatized used foam, other particulate solids which are not hydrolyzable by this process may enter tubular hydrolysis zone 11 with the particulate polyurethane foam. These invariably will be more dense materials. One or more traps may be positioned in or in communication with tubular reaction zone 11 to intercept such non-hydrolyzable solids and prevent their entry into gas - liquid separation tank 23. Such traps are here exemplified by traps 81 having removable caps 81-1 through which such non-hydrolyzable solids can be removed from reactor 9.

This invention will be more fully understood from the following examples:

EXAMPLE 1

Polyurethane foam (density equal to 0.3 gms/cm$^3$) is placed in an enclosed hydrolysis zone. Upon exposure to steam flowing at 500° F. temperature, the foam is converted to an exhaust vapor and a polymeric liquid product. The liquid hydrolysate is removed as bottoms from a gas -liquid separation zone. The exhaust vapor from such zone is cooled and converted to a liquid comprising an aqueous solution of diamines.

EXAMPLE 2

The process of Example 1 is repeated using apparatus such as that illustrated in the drawing. The particulate polyurethane foam is blown into the mouth of the hydrolysis zone with nitrogen gas while superheated steam is also introduced into the hydrolysis zone at the same point, both being directed toward the opposite end of the hydrolysis zone toward a gas - liquid separation zone. The temperature of the hydrolysis zone is maintained at 650° F. by electrical heating means. The combined partial pressures in the hydrolysis zone total between 1.0 and 1.5 atmospheres. The gaseous and liquid hydrolysate from such foam exits the hydrolysis zone and the gaseous and liquid components are separated in said gas - liquid separation zone which is maintained at a temperature of 500° F.

EXAMPLE 3

The process of Example 1 is repeated using apparatus such as that illustrated in the drawing. The particulate polyurethane foam is here augured into the mouth of the hydrolysis zone while a mixture of superheated steam and nitrogen is also introduced into this mouth of the hydrolysis zone and directed toward the opposite end of the hydrolysis zone toward a gas - liquid separation zone having a greater cross sectional area than the hydrolysis zone. The temperature of the hydrolysis zone is maintained at about 700° F. by electrical heating means.

The gaseous and liquid hydrolysate from such foam exits the hydrolysis zone at the opposite end into a gas - liquid separation zone of greater cross sectional area than than hydrolysis zone and which is maintained at a temperature of 500° to 600° F.

EXAMPLE 4

The procedures of Examples 3 and 4 are repeated with steam introduced into the hydrolysis zone in separate runs at pressures of 5, 25, 100 and 425 lbs./in$^2$.

The term "hydrolysis gas" as used herein means the gas or gaseous mixture which is introduced into one end of the hydrolysis zone and passes through the hydrolysis zone into the gas - liquid separation zone. It always includes water vapor which may enter the hydrolysis as superheated steam or may be converted to superheated steam while in said hydrolysis zone. It may also comprise a diluent gas such as air, nitrogen or other suitable gas.

We claim:

1. A continuous process for converting particulate polyurethane foam to diamines and liquid polymeric hydrolysis product of said polyurethane and simultaneously separating said diamines from said liquid polymeric product by:

1. propelling a stream of particulate polyurethane foam into a first end of an enclosed tubular hydrolysis zone maintained at a temperature in the range of about 425° to about 750° F.
   2. introducing water-vapor comprising hydrolysis gas into said first end of said hydrolysis zone under sufficient pressure to sweep through said hydrolysis zone and exit into an enclosed gas - liquid separation zone which has cross sectional area greater than said tubular hydrolysis zone and is in fluid communication with said tubular hydrolysis zone,
   3. successively impeding the forward movement of particles of polyurethane foam as they pass from said first end of said tubular reaction zone toward said gas - liquid separation zone with a series of two or more grids having apertures of cross sectional area which vary inversely with their distance from said first, end,
   4. removing gaseous effluent from the upper half of said gas - liquid separation zone comprising water vapor and said diamines, and
   5. removing said liquid polymeric hydrolysis product of said polyurethane foam from the lower half of said gas - liquid separation zone.

2. The process of claim 1 wherein the temperature of said hydrolysis zone is maintained between about 500° and about 650° F.

* * * * *